United States Patent [19]

Komoto

[11] 4,227,791
[45] Oct. 14, 1980

[54] LENS BARREL FOR FLASH PHOTOGRAPHY

[75] Inventor: Shinsuke Komoto, Tokyo, Japan

[73] Assignee: Asahi Kogaku Kogyo Kabushiki Kaisha, Tokyo, Japan

[21] Appl. No.: 31,691

[22] Filed: Apr. 19, 1979

[30] Foreign Application Priority Data

Apr. 20, 1978 [JP] Japan .................................. 53/47073

[51] Int. Cl.³ .............................................. G03B 3/00
[52] U.S. Cl. .................................................. 354/196
[58] Field of Search ....................... 354/196, 270, 286

[56] References Cited

U.S. PATENT DOCUMENTS

| 3,680,459 | 8/1972 | Okura | 354/196 |
| 4,141,636 | 2/1979 | Shimojima | 354/196 |

Primary Examiner—L. T. Hix
Assistant Examiner—Thomas H. Tarcza
Attorney, Agent, or Firm—Sughrue, Rothwell, Mion, Zinn and Macpeak

[57] ABSTRACT

A lens barrel in which a distance ring is coupled to an aperture ring so that correct exposure can be obtained in flash photography. In the arrangement, a rotating member, which rotates integrally with the aperture ring, and the distance ring can rotate functionally with respect to each other through a fixed cylinder and an engaging member which can move in the direction of optical axis with respect to the fixed cylinder.

2 Claims, 5 Drawing Figures

LENS BARREL FOR FLASH PHOTOGRAPHY

BACKGROUND OF THE INVENTION

This invention relates to a lens barrel of a so-called flashmatic lens in which during flash photography a distance ring is coupled to an aperture ring to automatically obtain a correct exposure, and, particularly, to a close-up lens barrel.

In normal flash photography, the relationship of a distance d between a light source and an object, an aperture value F of a photographic lens and a flash guide number G is as follows:

$$G = d \times F \ldots \quad (1)$$

From equation (1), it is apparent that the correct exposure can be obtained by the distance d and the aperture F which satisfy the equation (1). However, in close-up photography an effective aperture value instead of the aperture F given in equation (1) must be given by:

$$F \times (1+m) \ldots \quad (2)$$

where: m is the photographic magnification.

From equations (1) and (2):

$$G = d \times F \times (1+m) \ldots \quad (3)$$

Thus, in the close-up photography, it is apparent that the correct exposure can be obtained by the distance d and the aperture F which satisfy the equation (3).

If f is a focal distance, $\Delta$ is an amount of advancing, and the distance d between the light source and the object is made equal to the photographic distance, the relation of these parameters can be expressed according to a lens formula as follows:

$$\frac{1}{d - (f + \Delta)} + \frac{1}{f + \Delta} = \frac{1}{f}, \quad m = \frac{\Delta}{f} \quad (4)$$

By substituting equation (4) into the equation (3), the following equation can be obtained:

$$F = \frac{f \times G \times \Delta}{(f + \Delta)^3} \quad (5)$$

From equation (5), it is apparent that the equation (5) defines a curve with a maximum value at $\Delta = f/2$ and a point of inflection at $\Delta = f$, which asymptotically approaches zero.

In the flashmatic lens, the distance ring must be rotated to advance the lens barrel and also rotate the aperture ring in order to satisfy the exposure conditions mentioned above. Accordingly, a cam groove is required for advancing. Particularly, in the case of a normal flashmatic lens having a small amount of advancing, when the distance ring coupled to the aperture ring is rotated through the cam groove, as the amount of advancing $\Delta$ is increased, the aperture value F also increases. This is apparent from equation (5). Thus, the aperture ring can be rotated along the cam groove together with the rotation of the distance ring.

However, in close-up photography requiring a large amount of advancing, as is also apparent from the equation (5), the increase of the aperture value F becomes gradually less. Particularly, as the amount of advancing $\Delta$ increases at $\Delta = f/2$, the aperture value F decreases. Thus, in the case where the distance ring is coupled to the aperture ring, advancing must be carried out without the rotation of the distance ring only in the vicinity of $\Delta = f/2$. Accordingly, in order to achieve this, attempts to have the distance ring advance before $\Delta = f/2$ or a precision differential mechanism has been proposed. However, the former is disadvantageous in that it is necessary to provide a scale for photographic distance (photographic magnification) which displays the bidirectional movements of the distance ring, resulting in a decrease of operability. Also, the latter is disadvantageous in that the mechanism becomes complicated and can not be used in the close-up lens barrel having a large amount of advancing.

SUMMARY OF THE INVENTION

Accordingly, it is an object of this invention to provide a close-up lens barrel adapted to flash photography in which a distance ring can be coupled to an aperture ring to obtain a correct exposure and which is simple in structure even in the case where the aperture ring cannot be rotated with rotation of the distance ring or the aperture ring must be reversely rotated.

It is another object of this invention to provide for a close-up lens barrel that is easy to use and efficient.

These objects are attained in a lens barrel in which a distance ring is coupled to an aperture ring so that a correct exposure can be obtained in flash photography. An arrangement is used where a rotating member, which rotates integrally with the aperture ring, and the distance ring can rotate functionally with respect to each other through a fixed cylinder and an engaging member which can move in the direction of optical axis with respect to the fixed cylinder.

DETAILED DESCRIPTION OF THE PREFERRED EMBODIMENT

Figure 1:
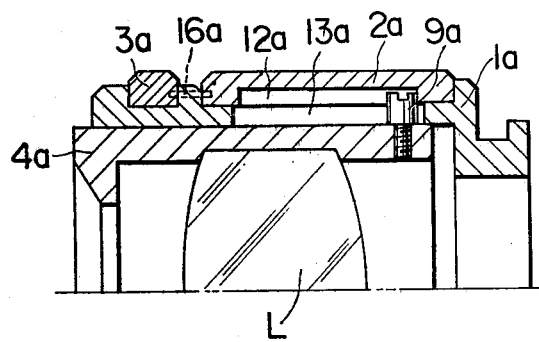
FIG. 1 is a fragmentary, longitudinal cross section view of a conventional lens barrel before advancement.

Referring now to the drawings and in particular FIG. 1 illustrating a conventional prior art device, reference numeral 1a designates a fixed cylinder having a portion attached to a camera body, and an elongated straight guide channel 13a formed in the fixed cylinder 1a. Reference numeral 2a designates a distance ring, and a cam groove 12a is formed in the distance ring 2a. An aperture ring 3a is coupled to the distance ring 2a with an aperture coupling 16a so that the aperture ring 3a and the distance ring 2a can be integrally rotated. A guide pin 9a is fixed to a lens supporting barrel 4a for supporting a lens L and engages the elongated straight guide channel 13a and the cam groove 12a.

Figure 2:
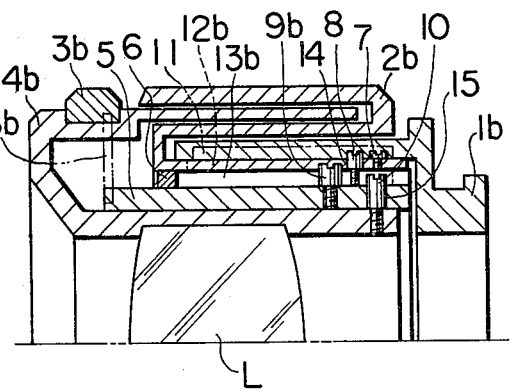
FIG. 2 is a fragmentary, longitudinal cross section view of a lens barrel according to this invention before advancement.

In FIG. 2 illustrating an embodiment according to this invention, reference numeral 1b designates a fixed cylinder having a portion attached to a camera body, and a cam groove 11 and an elongated straight guide channel not shown are formed in the fixed cylinder 1b. Reference numeral 2b designates a distance ring, and a lead groove 12b and a circumferentially extending groove 14 are formed in the distance ring 2b. An aperture ring 3b is coupled to a rotating member 5 with an aperture coupling 16b so that the aperture ring 3b and the rotating member 5 can be integrally rotated. The rotating member 5 is formed with a circumferentially extending groove 15. Reference numeral 6 designates an engaging member which advances with respect to the fixed cylinder 1b. A cam groove 13b for rotating the rotating member 5 and an elongated straight guide channel not shown are formed in the engaging member 6.

A guide pin 7 which is fixed to the distance ring 2b and engages the cam groove 11. A guide pin 8 is fixed to the engaging member 6 and engages the circumferentially extending groove 14 and the elongated straight guide channel, not shown, formed in the fixed cylinder 1b. Also, a guide pin 9b is fixed to the rotating member 5 and engages the cam groove 13b and the lead groove 12b. Further, a guide pin 10 is fixed to a lens supporting barrel 4b for supporting a lens L and engages the circumferentially extending groove 15 and the elongated straight guide channel, not shown, formed in the engaging member 6.

Figure 3:
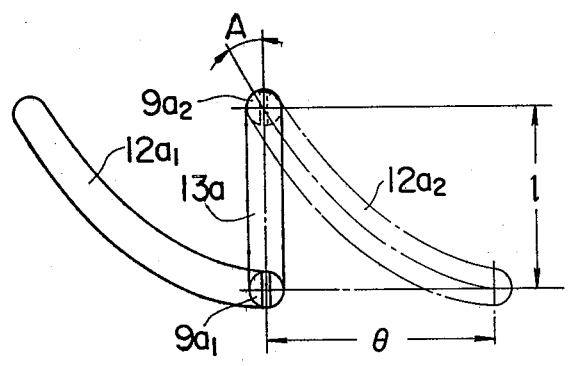
FIG. 3 is an explanatory view of movement between a guide pin and the relevant groove and channel in FIG. 1.

FIG. 3 shows the movement between the guide pin 9a and the relevant groove and channel in FIG. 1, and particularly the state where, when the cam groove 12a formed in the distance ring 2a moves a distance $\theta$ from its position $12a_1$ to $12a_2$. The guide pin 9a moves along the elongated straight channel 13a from its position $9a_1$ to $9a_2$. As shown in FIG. 3, the amount of displacement of the guide pin 9a in the direction of advancing is represented by l. Also, A designates the angle between the cam groove 12a and the straight guide channel 13a at the position $9a_2$ of the guide pin 9a.

Figure 4:
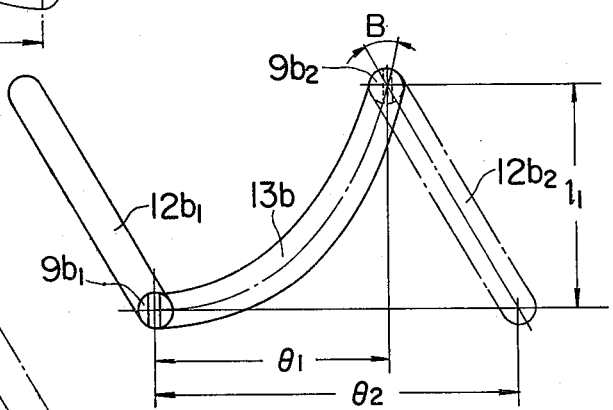
FIGS. 4 and 5 are explanatory views of movement between guide pins and the relevant grooves in FIG. 2.

FIG. 4 shows the movement between the guide pin 9b and the relevant grooves in FIG. 2, and particularly the state where, when the lead groove 12b formed in the distance ring 2b moves a distance $\theta_2$ from its position $12b_1$ to $12b_2$. The guide pin 9b moves along the cam groove 13b from its position $9b_1$ to $9b_2$. The amount of displacement of the guide pin 9b is represented by $\theta_1$, and the amount of displacement of the guide pin 9b in the direction of advancing is represented by l. Also, B designates the angle between the lead groove 12b and the cam 13b at the position $9b_2$ of the guide pin 9b.

Figure 5:
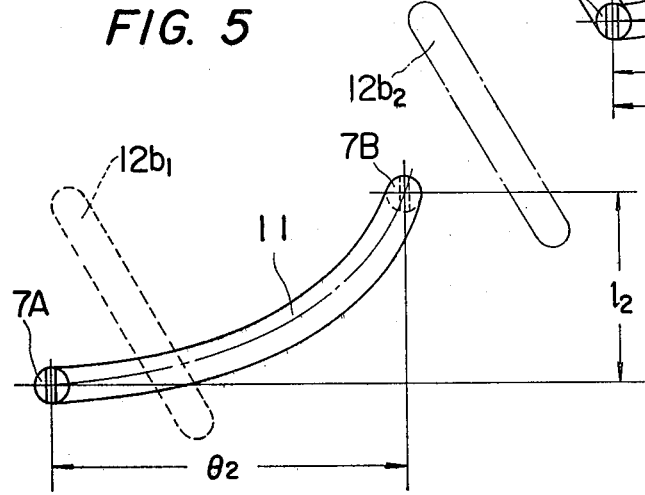

FIG. 5 shows the movement between the guide pin 7 and the relevant grooves in FIG. 2, and particularly the state, where with rotation of the distance ring 2b, the guide pin 7 fixed to the distance ring 2b moves a distance $\theta_2$ from its position 7A to 7B and, simultaneously, the lead groove 12b formed in the distance ring 2b moves from its position $12b_1$ to $12b_2$ integrally with the guide pin 7. The amount of displacement of the guide pin 7 in the direction of advancing is represented by $l_2$.

The operation of the prior art device will now be described with reference to FIGS. 1 and 3. When the distance ring 2a is rotated, the cam groove 12a formed in the distance ring 2a is rotated therewith to thereby move the guide pin 9a fixed to the lens supporting barrel 4a from the position $9a_1$ to $9a_2$ along the elongated straight guide channel 13a formed in the fixed cylinder 1a. That is, while the cam groove 12a moves the distance $\theta$, the guide pin 9a advances the distance l. These displacements $\theta$ and l can be determined by appropriately selecting the configuration of the cam groove 12a. Therefore, if the distance ring 2a is coupled to the aperture ring 3a with the aperture coupling 16a, the displacement $\theta$ can be regarded as the aperture. Thus, if the cam groove 12a is selected to satisfy the relation between the amount of advancing and the aperture due to the guide number mentioned above, the flashmatic lens can be obtained. However, in close-up photography, the angle A gradually approaches zero making advancing very difficult. Then, when the angle A becomes zero, the advancing becomes completely impossible because the applying force to the guide pin 9a is at right angles to the elongated straight guide channel 13a.

The operation according to this invention will now be described with reference to FIGS. 2, 4 and 5.

When the distance ring 2b is rotated, the guide pin 7 fixed to the distance ring 2b and the lead groove 12b formed in the distance ring 2b are rotated therewith to move the guide pin 9b fixed to the rotating member 5 from the position $9b_1$ to $9b_2$ along the cam groove 13b formed in the engaging member 6. That is, the guide pin 9b moves the distance $\theta_1$ and also moves the distance $l_1$ in the direction of advancing. The amount of displacement $\theta_1$ is equal to the rotational angle of the rotating member 5 to which the guide pin 9b is fixed. This is transmitted through the aperture coupling 16b to the aperture ring 3b. Thus, the aperture is determined by $l_1$.

On the other hand, when the guide pin 7 moves the distance $\theta_2$ in the direction along the cam groove 11, it also moves the distance $l_2$ in the direction of advancing. The guide pin 8 fixed to the engaging member 6 is not affected by the rotation of the distance ring 2b because of the existence of the circumferentially extending groove 14 formed in the distance ring 2b. Accordingly, the guide pin 8 advances the distance $l_2$ along the elongated straight guide channel, not shown, the fixed cylinder 1b whereby the engaging member 6 also advances the same distance $l_2$. Furthermore, since the guide pin 10 fixed to the lens supporting barrel 4b is not affected by the rotation of the rotating member 5 because of the existence of the circumferentially extending groove 15, the lens supporting barrel 4b advances the same distance $l_2$ as the rotating member 5 along the elongated straight guide channel, not shown, formed in the engaging member 6. Accordingly, when the distance ring 2b moves the distance $\theta_2$, the guide pin 9b, i.e. the rotating member 5, moves the distance $\theta_1$ with respect to the fixed cylinder 1b. As a result the rotating member 5 advances the distance $(l_1+l_2)$. However, since the lens supporting barrel 4b also advances the distance $(l_1+l_2)$, the total amount of advancing of the lens remains $(l_1+l_2)$.

Thus, if the cam groove 13b, the lead groove 12b and the cam groove 11 are selected to satisfy the relation between the amount of advancing and the aperture due to the guide number mentioned above, the flashmatic lens can be obtained. Even in the case where $\theta_1$ does not significantly increase, regardless of the increase of $l_1$ as in the close-up photography, advancing can be accomplished by making the angle B larger without interfering with the operation.

As shown in the embodiments of this invention, 13b is the cam groove and 12b is the lead groove, however, these elements may be reversed or the numerals may designate only the cam groove.

Thus, the arrangement according to this invention is advantageous in that the rotating member 5 to which the guide pin 9b is fixed rotates functionally but not integrally or linearly with respect to the rotation of the distance ring 2b. When the angle B cannot be enlarged by various limitations, by utilizing the force in the direction of advancing caused when the distance ring 2b moves according to the slope of the cam groove 11 in the direction of advancing, the angle B can be made smaller compared with the case where the cam groove is not provided. Further, according to this arrangement, the large amount of advancing which is necessary in the close-up photography can be achieved.

Moreover, according to this invention, even through only the advancing must be carried out under a constant aperture in the close-up photography using a flashmatic lens, the large amount of advancing can be also achieved by utilizing the relationship of the rotating member and the cam groove or the lead groove.

Although a flashmatic releasing mechanism and a converting mechanism for converting ASA sensitivity are omitted from FIGS. 1 and 2, it is apparent that the embodiment according to this invention can be adapted to a lens having a converting mechanism in which notches are provided corresponding to ASA sensitivity in the rotating member 5 shown in FIG. 2. The aperture coupling 16a can be set to meet a scale of ASA sensitivity provided in the lens supporting ring 4b by an external operation.

What is claimed is:

1. In a lens barrel assembly including a fixed cylinder and in which a distance ring is coupled to an aperture ring for rotation relative to said fixed cylinder so that a correct exposure can be obtained in flash photography, the improvement comprising:
    rotating member means for rotation integrally with said aperture ring; and
    engaging means movable with respect to said fixed cylinder in the direction of an optical axis so that said aperture ring and said distance ring can rotate functionally with each other; and wherein:
    said fixed cylinder has a cam groove therein, and said distance ring has a pin engaging said cam groove;
    said engaging means has cam groove means for rotating said rotating member means;
    said distance ring has a lead groove and a circumferentially extending groove;
    said engaging means has a pin engaging said circumferentially extending groove; and
    said rotating member means has a pin engaging said lead groove of said distance ring and the cam groove means of said engaging means.

2. The improvement of claim 1 wherein said rotating member has a circumferentially extending groove, further comprising a lens supporting barrel, and a pin attached to said lens supporting barrel engaging the circumferentially extending groove of said rotating member means.

* * * * *